(12) United States Patent
Molnar et al.

(10) Patent No.: US 8,385,360 B2
(45) Date of Patent: Feb. 26, 2013

(54) CONTROL CHANNEL FORMULATION IN OFDM SYSTEMS

(75) Inventors: Karl Molnar, Cary, NC (US); Jung-Fu Cheng, Cary, NC (US); Stefan Parkvall, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 482 days.

(21) Appl. No.: 12/740,457

(22) PCT Filed: Oct. 28, 2008

(86) PCT No.: PCT/IB2008/002876
§ 371 (c)(1),
(2), (4) Date: Apr. 29, 2010

(87) PCT Pub. No.: WO2009/056943
PCT Pub. Date: May 7, 2009

(65) Prior Publication Data
US 2010/0260036 A1    Oct. 14, 2010

Related U.S. Application Data

(60) Provisional application No. 60/983,372, filed on Oct. 29, 2007.

(51) Int. Cl.
*H04L 12/28* (2006.01)
(52) U.S. Cl. ........................................ 370/431; 370/464
(58) Field of Classification Search ........... 370/431–464
See application file for complete search history.

(56) References Cited

U.S. PATENT DOCUMENTS

| | | | |
|---|---|---|---|
| 2007/0097981 A1* | 5/2007 | Papasakellariou | 370/394 |
| 2008/0233966 A1* | 9/2008 | Scheim et al. | 455/452.1 |
| 2008/0298224 A1* | 12/2008 | Pi et al. | 370/204 |
| 2009/0074090 A1* | 3/2009 | Xu et al. | 375/260 |

FOREIGN PATENT DOCUMENTS

WO    WO 2007/095860 A    8/2007

OTHER PUBLICATIONS

Nokia et al: "Control channel to RE mapping" 3GPP Draft; (R1-074318) Control Channel to Remapping, 3GPP, Mobile Competence Centre ,650, Route Des Lucioles , F-06921 Sophia-Anti Polis Cedex , France, vol. RAN WGl, no.Shanghai,China; 20071008, Oct. 2, 2007 XP050107834.

Huawei: "Generic interleaver for PDCCH" 3GPP Draft; (R1-074226), 3GPP, Mobile Competence Centre ; 650, Route Des Lucioles ; F-06921 Sophia-Antipolis Cedex ; France, vol. RAN WGI, no. Shanghai, China; 20071008, Oct. 2, 2007, XP050107752.

(Continued)

*Primary Examiner* — Andrew Lai
*Assistant Examiner* — Juvena Loo
(74) *Attorney, Agent, or Firm* — Roger S. Burleigh

(57) ABSTRACT

Control channel information is formulated for transmission in orthogonal frequency division multiplexing (OFDM) systems. In an example embodiment, a method entails formulating control channel information for a transmitting device operating in an OFDM system in which a control channel spans n OFDM symbols, with n being an integer. The method includes acts of allocating, creating, and mapping. Control channel data is allocated to at least one set of resource element groups. At least one order for the set of resource element groups is created in accordance with one or more permutation mechanisms that involve at least one interleaving sequence having a low cross-correlation property. The set of resource element groups is mapped to resource elements of the n OFDM symbols of the control channel responsive to the order that is created using the permutation mechanism(s). The permutation mechanisms may include interleaving sequence(s) and/or cyclic shift(s).

28 Claims, 8 Drawing Sheets

OTHER PUBLICATIONS

Motorola: "Interleaver Design for Control Channel Element to RE Group Mapping" 3GPP Draft; R1-074488 (R1-073994) Interleavers for CCE to RE Group Mapping, 3GPP, Mobile Competence Centre ; 650, Route Des Lucioles ; F-06921 Sophia-Antipolis Cedex; France, vol. RAN WG1, no. Shanghai, China; 20071008, Oct. 10, 2007,XP050107991.

LG Electronics: "Interleaver Design for CCE-to-RE Mapping" 3GPP Draft; (R1-074472), 3GPP, Mobile Competence Centre; 650, Route Des Lucioles; F-06921 Sophia-Antipoliscedex; France,vol. RAN WG1, no. Shanghai, China; 20071008, Oct. 9, 2007, XP050107977.

Ericsson: "CCE-to-RE Mapping" 3GPP Draft; (RI-074370), 3GPP, Mobile Competence Centre; 650, Route Des Lucioles ; F-06921 Sophia-Antipolis Cedex; France, vol. RAN WG1, no. Shanghai, China; 20071008, Oct. 2, 2007, XP050107885.

Samsung: "PHICH/PDCCH to RE mapping" 3GPP TSG RAN WG1 Meeting #50 bis; (R1-074080), 3GPP,Shanghai, China, Oct. 8-12, 2007.

LG Electronics: "Downlink Control Signaling for SU-MIMO" 3GPP TSG RAN WG1 Meeting #50bis, (R1-074194), 3GPP, Shanghai, China, Oct. 8-12, 2007.

3GPP: "Evolved Universal Terrestrial Radio Access (E-UTRA); Multiplexing and channel coding (Release 8)" 3GPP; TSG RAN 36.212 v8.0.0 (Sep. 2007); Sep. 2009.

Maric, Svetislav, et al.: "A Class of Frequency Hop Codes with Nearly Ideal Characteristics for Use in Multiple-Access Spread-Spectrum Communications and Sonar Systems", IEEE Transactions on Communications, vol. 40, No. 9, Sep. 1992.

Maric, Svetislav, et al.: "Frequency Hop Multiple Access Codes Based Upon the Theory of Cable Congruences", IEEE Transactions on Aerospace and Electronic Systems, vol. 26, No. 6, Nov. 1990.

Bellegarda, Jerome R., et al.: "Time-Frequency Hop Codes Based Upon Extended Quadratic Congruences"; IEEE Transactions on Aerospace and Electronic Systems, vol. 24, No. 6, University of Rochester, Rochester, NY, Nov. 1988.

\* cited by examiner

| 1 | 1 | 1 | 2 | 2 | 2 | 3 | 3 | 3 | 4 | 4 | 4 |
|---|---|---|---|---|---|---|---|---|---|---|---|
| 1 | 1 | 1 | 2 | 2 | 2 | 3 | 3 | 3 | 4 | 4 | 4 |

FIG. 3

| 1 | 3 | 5 | 9 | 4 | 7 | 2 | 12 | 10 | 6 | 11 | 8 |
|---|---|---|---|---|---|---|----|----|---|----|---|

FIG. 4

| 1 | 1 | 2 | 3 | 2 | 3 | 1 | 4 | 4 | 2 | 4 | 3 |
|---|---|---|---|---|---|---|---|---|---|---|---|
| 2 | 4 | 3 | 1 | 1 | 2 | 3 | 2 | 3 | 1 | 4 | 4 |

FIG. 5

| 4 | 4 | 2 | 4 | 3 | 1 | 1 | 2 | 3 | 2 | 3 | 1 |
|---|---|---|---|---|---|---|---|---|---|---|---|
| 2 | 3 | 1 | 4 | 4 | 2 | 4 | 3 | 1 | 1 | 2 | 3 |

| 1 | 3 | 1 | 2 | 4 | 3 | 2 | 1 | 3 | 4 | 2 | 4 |
|---|---|---|---|---|---|---|---|---|---|---|---|
| 2 | 3 | 2 | 4 | 1 | 1 | 4 | 4 | 1 | 3 | 2 | 3 |

| 2 | 1 | 3 | 4 | 2 | 4 | 1 | 3 | 1 | 2 | 4 | 3 |
|---|---|---|---|---|---|---|---|---|---|---|---|
| 4 | 4 | 1 | 3 | 2 | 3 | 2 | 3 | 2 | 4 | 1 | 1 |

| 1 | 3 | 1 | 2 | 4 | 3 | 2 | 1 | 3 | 4 | 2 | 4 |
|---|---|---|---|---|---|---|---|---|---|---|---|
| 2 | 1 | 3 | 4 | 2 | 4 | 1 | 3 | 1 | 2 | 4 | 3 |

| 2 | 3 | 2 | 4 | 1 | 1 | 4 | 4 | 1 | 3 | 2 | 3 |
|---|---|---|---|---|---|---|---|---|---|---|---|
| 4 | 4 | 1 | 2 | 3 | 2 | 2 | 3 | 2 | 4 | 1 | 1 |

CONTROL CHANNEL FORMULATION IN OFDM SYSTEMS

CROSS-REFERENCE TO RELATED APPLICATION

This U.S. Nonprovisional patent application claims the benefit of priority from U.S. Provisional Patent Application No. 60/983,372, filed 29 Oct. 2007, and entitled "Control Channel Symbol Permutation with Interference Randomization and OFDM Symbol Partitioning". U.S. Provisional Patent Application No. 60/983,372 is hereby incorporated by reference in its entirety herein.

TECHNICAL FIELD

The present invention relates generally to communications systems, and in particular, but by way of example only, to formulation of control channel transmissions in orthogonal frequency division multiplexing (OFDM) systems.

BACKGROUND

Many specialized terms and abbreviations are used in the communications arts. At least some of the following are referred to within the text that follows, such as in this background and/or the description sections. Thus, the following terms and abbreviations are herewith defined:
  3GPP 3rd Generation Partnership Program/Project
  CCE Control Channel Element
  HARQ Hybrid Automatic-Repeat-Request
  LTE Long Term Evolution (e.g., of a 3G system)
  OFDM Orthogonal Frequency Division Multiplexing
  PBRI Pruned Bit-Reversal Interleaver
  PCFICH Physical Control Format Indicator Channel
  PDCCH Physical Downlink Control Channel
  PHICH Physical HARQ indicator Channel
  QPP Quadratic Permutation Polynomials
  WiMAX Worldwide Interoperability for Microwave Access Electronic communication forms the backbone of today's information-oriented society. Electronic communications are transmitted over wireless or wired channels using electromagnetic radiation. The availability and capacity of electronic communications is typically limited by the bandwidth of the communications channel. Especially in wireless environments, the bandwidth of a communications channel may be limited by the finite nature of the electromagnetic spectrum.

The available bandwidth of a communications channel, even given a finite allocation of the electromagnetic spectrum, may be increased by adopting any of a number of different schemes. Certain schemes enable more information to be communicated in a given spectrum allocation. This efficient utilization of spectrum can reduce the cost of communication services being provided, can enable richer communication services to be provided, or both.

Example communication schemes include sharing spectrum in frequency, space, and/or time; compressing information; coding information; modulating data signals; combinations thereof, and so forth. Different communication paradigms rely on such communication schemes to varying degrees to efficiently utilize spectrum. An example of relatively modern communication paradigms involve those directed to OFDM systems. With OFDM systems, information blocks are allocated in both frequency and time. OFDM systems appear to offer relatively efficient utilization of spectrum for next generation communication systems.

FIG. 1 depicts a portion of an example spectrum resource grid 100 for an OFDM system. As illustrated, the horizontal dimension corresponds to frequency and the vertical dimension corresponds to time. The frequency dimension is divided into OFDM sub-carriers 104. The temporal dimension is divided into OFDM symbols 106. Spectrum resource grid 100 includes multiple resource elements 108.

Each resource element 108 is one OFDM symbol by one OFDM sub-carrier. In some OFDM systems, the smallest part of the electromagnetic spectrum that may be allocated is referred to as a resource block 102. In OFDM systems that are based on LTE, for example, a resource block 102 is typically twelve OFDM sub-carriers by seven (and sometimes six) OFDM symbols. It should be noted that a resource block 102 may have a different dimensionality. Also, the total number of available OFDM sub-carriers usually depends on a given system bandwidth.

Thus, in an LTE system for example, the structure of the OFDM signal contains resource elements 108 spaced in both time (OFDM symbols 106) and frequency (OFDM sub-carriers 104). These resource elements 108 are grouped into a collection of resource blocks 102 that make up the OFDM signal to be transmitted. Within this collection of resource blocks 102, certain resource elements 108 are designated to contain control channel signaling information.

In a cell-based wireless system, for example, base stations within each cell transmit these control channels to the various mobiles contained within the cells. Unfortunately, the transmissions from different cells potentially overlap in time and/or frequency, and they may interfere with each other when there is also spatial overlap. This interference may be particularly harmful because the control channel transmitted from a specific cell may be persistent to individual mobiles in other cells.

The control channel information is organized in a manner that makes it efficient to detect the essential information used to further decode both the control and data signals. The fields that are present in the control channel include the PHICH, PCFICH, and PDCCH fields. These fields are described in 3GPP, Technical Specifications 36.212 v8, "Multiplexing and Channel Coding (Release 8)," 2007. Certain example variables and OFDM characteristics that are described herein relate to an LTE implementation; however, the traits and principles that are described herein are applicable to other types of OFDM systems.

One factor relevant to transmitting the control channel signal is that the applicable control information be spread across frequency so that frequency diversity may be obtained. Because the control signal uses a fixed-rate coding (e.g., in LTE), frequency diversity is particularly pertinent to providing reliable detection of the control signal. Another relevant factor is that control channel transmissions may originate from multiple base stations, and their signals may therefore collide in a persistent manner. This potential state of persistent collision, coupled with a non-uniform setting of the transmit power, may result in persistent interference from neighboring base stations for some mobiles. Consequently, the control channel signal in LTE is to use some form of interference randomization to at least partially alleviate this interference.

One prior approach that has been proposed to address these issues is described in R1-074226, "Generic Interleaver for PDCCH," Huawei, YSG RAN WG1 meeting #50bis, Shanghai, China, Oct. 8-12, 2007. This approach uses a common interleaver design to permute symbol groups, followed by a cell-specific cyclic shift to further distinguish the transmitted signals of different base stations. This basic approach, using a common interleaver followed by a cell-specific cyclic shift, is adopted in a number of cases (e.g., R1-073994, R1-074080, R1-074318, and R1-074370). Each of these cases does, however, describe a different interleaver design. In R1-074194 ("Downlink control signaling for SU-MIMO," LG Electronics, YSG RAN WG1 meeting #50bis, Shanghai, China, Oct. 8-12, 2007.), a similar approach is taken to try to achieve diversity while addressing the interference. However, in R1-074194 a cell-specific interleaver is used instead of the common interleaver design.

Common aspects for each of the approaches mentioned above include the following considerations. First, the PHICH, PCFICH and PDCCH control information are collected into symbol groups of four subcarriers located relatively close together. This collection is called a mini-CCE. Second, a number of mini-CCEs form a CCE. CCEs are concatenated together to form the PDCCH. Third, the PDCCH mini-CCEs are interleaved, and then they are mapped to the resource elements. Fourth, the PHICH and PCFICH may be fixed within the OFDM subframe or interleaved together with the PDCCH. Fifth, the mapping takes place over first one, two, or three OFDM symbols continuously.

One example existing mapping approach has the mini-CCEs ordered by resource block. This existing mapping approach is described in PCT Patent Application No. PCT/SE2008/050372, which was filed 31 Mar. 2008 and entitled "Method and Arrangement in a Telecommunication System," by inventors K. Molnar, J-F. Cheng and S. Parkvall for Applicant Telefonaktiebolaget LM Ericsson. PCT Patent Application No. PCT/SE2008/050372 claims priority from U.S. Provisional Patent Application No. 60/974,949, which was filed on 25 Sep., 2007. This resource-block-oriented mapping approach is shown in FIG. 2, where there are 8 mini-CCEs per resource block.

FIG. 2 illustrates an example of symbol groups defined and mapped continuously over three OFDM symbols in accordance with an existing approach. Mapping 200 is shown with OFDM sub-carriers along the horizontal axis and with OFDM symbols along the vertical axis. Mapping 200 includes one resource block 102 and the beginning of an adjacent resource block to its right. Each resource block includes at least one reference element 202. Resource block 102 includes four reference elements 202 as represented by the shaded blocks. Reference elements 202 are used, for example, for channel estimation but not for data or control channel transmission. Three OFDM symbols are shown for mapping 200 because three OFDM symbols are available for control channel information in this example. Hence, the other (e.g., four) OFDM symbols of resource block 102 are omitted.

As illustrated, each resource block 102 includes eight mini-CCEs numbered 1 to 8. Within a given resource block 102, the mini-CCEs are order by frequency first, then OFDM symbol, and lastly across resource blocks. This approach is described in PCT Patent Application No. PCT/SE2008/050372 in order to preserve frequency diversity when performing the PDCCH interleaving. In PCT Patent Application No. PCT/SE2008/050372, which is by the same inventors as the instant patent application, the use of a QPP interleaves is described because it has good frequency diversity properties. Other interleaving approaches include the approach proposed in R1-074226, which is based on the use of a Costas array. The Costas array is considered to have good autocorrelation properties, and it can provide good interference randomization.

A further difficulty arises in that the PHICH and PCFICH are expected to be detected prior to detecting the PDCCH, which may span one, two, or three OFDM symbols. Interleaving the PDCCH together with the PHICH and/or the PCFICH is undesirable inasmuch as it is then ambiguous as to exactly where the PHICH and PCFICH fields are located. One alternative is to fix the position of the PHICH and PCFICH fields so that they are located in known positions. However, if these two fields are fixed, then no interference randomization may be instituted to inoculate them from persistent interference.

Consequently, there is a need to address these deficiencies in the current state of the art. Such deficiencies and other needs are addressed by one or more of the various embodiments of the present invention.

SUMMARY

It is an object of certain embodiment(s) of the present invention to at least mitigate or ameliorate some of the deficiencies of the conventional approaches as addressed above.

It is another object of certain embodiment(s) of the present invention to increase interference randomization while maintaining frequency diversity using different permutation mechanisms.

Generally; control channel information is formulated for transmission in OFDM systems. In an example embodiment, a method entails formulating control channel information for a transmitting device operating in an OFDM system in which a control channel spans n OFDM symbols, with n being an integer. The method includes acts of allocating, creating, and mapping. Control channel data is allocated to at least one set of resource element groups. At least one order for the set of resource element groups is created in accordance with one or more permutation mechanisms that involve at least one interleaving sequence having a low cross-correlation property. The set of resource element groups is mapped to resource elements of the n OFDM symbols of the control channel responsive to the order that is created using the permutation mechanism(s).

The permutation mechanisms may include interleaving sequence(s) and/or cyclic shift(s). The permutation mechanisms may be applied separately to different OFDM symbols or jointly across multiple OFDM symbols. Interleaving sequences and/or cyclic shifts may be employed on a per-cell basis or may be common to multiple cells of an OFDM system, depending on implementation. Selection of an interleaving sequence with a per-cell scheme may be based on an identifier of the cell. Other embodiments are directed to a transmitting device and to a memory including processor-executable instructions.

In yet another example embodiment, a transmitting device is adapted to formulate control channel information in an OFDM system in which a control channel spans n OFDM symbols, with n being an integer. The transmitting device includes one or more permutation mechanisms, a data allocator, an order creator, and a resource element group mapper. The permutation mechanism(s) include at least one interleaving sequence having a low cross-correlation property. The data allocator allocates control channel data to at least one set of resource element groups. The order creator creates at least one order for the set of resource element groups in accordance with the permutation mechanisms. A resource element group mapper maps the set of resource element groups to resource elements of the n OFDM symbols of the control channel responsive to the order that is created using the permutation mechanisms.

An advantage of certain embodiment(s) of the present invention is that both relatively good interference randomization and good frequency diversity performance may be achieved when using interleaving sequences that are selected from a family of sequences having both low auto-correlation and low cross-correlation properties.

Another advantage of certain embodiment(s) of the present invention is that PHICH and PCFICH fields may be handled elegantly when permutation mechanisms are applied per OFDM symbol. Other advantages are noted herein and/or are otherwise apparent from the description.

Additional embodiments are described and/or claimed herein. Example additional embodiments include, by way of example but not limitation, methods, devices, arrangements, memory, systems, and so forth. Additional aspects of the invention are set forth in part in the detailed description, drawings, and claims that follow, and in part may be derived from the detailed description and drawings, or can be learned by practice of the invention. It is to be understood that both the foregoing general description and the following detailed description are exemplary and explanatory only and are not restrictive of the invention as disclosed or as claimed.

BRIEF DESCRIPTION OF THE DRAWINGS

A more complete understanding of the present invention may be obtained by reference to the following detailed description when taken in conjunction with the accompanying drawings wherein:

FIG. 3 illustrates an example base CCE pattern for two OFDM symbols in accordance with a described proposal.

FIG. 4 illustrates an example indexing per-OFDM symbol for mini-CCEs based on a Costas sequence.

FIGS. 5 and 6 illustrate example mini-CCE permutations for a desired cell and an interfering cell, respectively.

FIGS. 14 and 15 illustrate mini-CCE permutations for a desired cell and an interfering cell, respectively, that result when each OFDM symbol is associated with a different interleaving sequence and there is a per-cell cyclic shift in accordance with an implementation (a) of a first embodiment.

FIGS. 16 and 17 illustrate mini-CCE permutations for a desired cell and an interfering cell, respectively, that result when each OFDM symbol is associated with a different cyclic shift and there is a per-cell interleaving sequence in accordance with an implementation (b) of the first embodiment.

DETAILED DESCRIPTION

In short, existing approaches are deficient inasmuch as they fail to provide both frequency diversity and interference randomization for each of the scenarios of interest across multiple different cells of an OFDM system. An alternative is to interleave the mini-CCEs separately for each OFDM symbol. In such a case, if three OFDM symbols are used to transmit the PHICH, PCFICH, and PDCCH, then three different symbol group permutations may be used to attain a measure of frequency diversity and interference randomization. Example interleaving and cyclic shift patterns that result in relatively good frequency diversity and interference randomization when used on a per-OFDM-symbol basis are described herein below, particularly with regard to the first and second embodiments.

Figure 2:
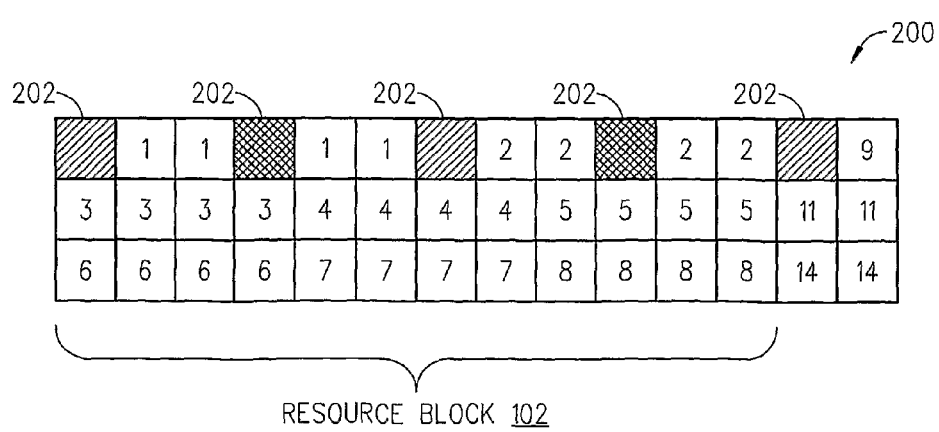
FIG. 2 illustrates an example of symbol groups defined and mapped continuously over three OFDM symbols in accordance with an existing approach.

An explanation as to why interleaving and cyclic shift patterns are to be selected with some degree of caution is provided by way of the following example. This example involves a control channel for an LTE system that has four transmit antennas and two OFDM control symbols in a bandwidth of 1.25 MHz. Due to the existence of four reference symbol elements in each resource block, there are two mini-CCEs available in each resource block. Over 1.25 MHz, there are 12 mini-CCEs in which to place the control channel. Next, an effect is described of using an interleaving approach that is similar to the existing one described above with reference to FIG. 2.

FIG. 3 illustrates an example base CCE pattern 300 for two OFDM symbols in accordance with a described proposal. In base CCE pattern 300, each tile represents one mini-CCE. In other words, each tile of base CCE pattern 300 corresponds to one set of four resource elements numbered similarly in FIG. 2. As noted above, each mini-CCE may be comprised of a different number of resource elements than four. If, in each OFDM symbol, separate interleaving is used with four CCEs each containing 3 mini-CCEs, then base CCE pattern 300 prior to any interleaving is as shown in FIG. 3.

FIG. 4 illustrates an example indexing 400 per-OFDM symbol for mini-CCEs based on a Costas sequence. A truncated Costas sequence can be constructed to interleave the mini-CCEs of each OFDM symbol separately. Such an example truncated Costas sequence is shown in FIG. 4 as indexing 400. Indexing 400 is applied separately to each OFDM symbol of base CCE pattern 300 in an interleaving operation. A cyclic shift may also be separately applied to each OFDM symbol. Examples of these interleaving and cyclic shift operations are provided in FIGS. 5 and 6.

FIGS. 5 and 6 illustrate example mini-CCE permutations 500 and 600 for a desired cell and an interfering cell, respectively. A cyclic shift is used for each OFDM symbol to create a measure of frequency diversity in the transmitted control signal. Mini-CCE permutation 500 is for the desired cell. It has cyclic shifts of zero and three for the first and second OFDM symbols, respectively. Mini-CCE permutation 600 is for the interfering cell. It started with the same base CCE pattern 300 (of FIG. 3) and same indexing 400 (of FIG. 4), but it has different cyclic shifts. Specifically, mini-CCE permutation 600 has cyclic shifts of five and eight for the first and second OFDM symbols, respectively.

A disadvantage to using the above approach is that the interference patterns remain static across the OFDM symbols. With reference to FIGS. 5 and 6, it is apparent that the mini-CCEs numbered 4 in mini-CCE permutation 600 of the interfering cell interfere with the mini-CCEs numbered 1 in mini-CCE permutation 500 of the desired cell, regardless of which of the first and second OFDM symbols is considered. This can be especially harmful if the interfering mini-CCEs are transmitted with additional power such that they present significant interference to the control channel of the desired cell.

It should be understood that the interleaver used in the example above, which involves a Costas sequence, does not explicitly cause interference due to poor auto-correlation properties of the sequence. However, the common cyclic shift at both the cell level and the OFDM symbol level fails to randomize the interference for a specific realization of the sequence and shift values.

In response to such concerns, example interleaving sequences and/or cyclic shifts that are designed to at least ameliorate these potentials for interference are described herein below. Generally, different permutation mechanisms may be utilized when formulating control channel information in OFDM systems. Different permutation mechanisms and/or manners of applying them are described herein below in terms of three example embodiments.

These three example embodiments each order resource element groups for an OFDM control channel. The resource element group ordering is performed in accordance with one or more permutation mechanisms. These permutation mechanisms entail different interleaving sequences and/or cyclic shifts. These three example embodiments are described in terms of the following variables. There are n OFDM symbols. The interleaver length per-OFDM symbol is L (which corresponds to L mini-CCEs). The embodiments are first introduced and described generally in terms of constructing n symbol permutation patterns in accordance with n permutation mechanisms.

In a first example embodiment, a family of F sequences is selected with good auto-correlation and good cross-correlation properties. A sequence may be considered to have good auto-correlation properties if, for example, a correlation between the sequence and a cyclic shifted version of the sequence is low. A family of sequences may be considered to have good cross-correlation properties if, for example, a correlation between any two sequences of the family is low for any cyclic shift of those two sequences. A correlation may be considered low if the consequential effect of the correlative relationship enables a given predetermined communication threshold (e.g., as set by a standard, regulation, or design goal) to be satisfied. In practice, a numerical threshold may be set that indicates a low correlation.

Two example implementations (a) and (b) are described below for constructing the interleavers to be used for the first embodiment. With implementation (a), a common set of n interleaving sequences is selected from the family of F sequences and is used in each cell. Different cyclic shifts are used in each cell with these n interleaving sequences. This implementation has the following characteristics. The cyclic shift can be based on the identifier of the cell (e.g., the cell-ID), and interference randomization results from the good auto-correlation properties of each sequence. Frequency diversity results from different interleaving sequences being used in different OFDM symbols and the good cross-correlation properties of each sequence. Any additional relative cyclic shift between OFDM symbols with a given cell may be omitted.

With implementation (b), different interleaving sequences are used in different cells. Within a cell different cyclic shifts are used per-OFDM symbol. This implementation has the following characteristics. Frequency diversity is obtained from the different cyclic shifts in different OFDM symbols and the good auto-correlation properties of the sequences. Interference randomization results from the different interleaving sequences in different cells and the good cross-correlation properties of the sequences. With implementation (b), one function that hashes the cell-ID to $\{0, 1, \ldots, F-1\}$ is utilized, and n−1 cyclic shifts are also utilized. The cyclic shifts may be common across each of the cells. Alternatively, the cyclic shifts may be "optimized" parameters that are listed together with the interleaving sequences (e.g., the cyclic shifts may be different depending upon which sequence is selected).

In a second example embodiment, a family of F sequences is selected with good cross-correlation (but not necessarily good auto-correlation) properties. Different interleaving sequences are used in both different cells and in different OFDM symbols. Frequency diversity and interference randomization both result from the different interleaving sequences and the good cross-correlation properties of the sequences.

A set of n functions may be utilized to hash the cell-ID to $\{0, 1, \ldots, F-1\}$. Alternatively, one function that hashes the cell-ID to $\{0, 1, \ldots, F-1\}$ may be used, with n−1 sequence identification (sequence ID) offsets being used for the remaining n−1 OFDM symbols. The sequence ID offsets may be common across all cells. Or, instead, the sequence ID offsets may be "optimized" parameters that are listed together with the interleaving sequences (e.g., the sequence ID offsets may be different depending upon which sequence is selected).

In a third example embodiment, a family of F sequences is selected with good auto-correlation and good cross-correlation properties. Two example implementations (a) and (b) are described below for constructing interleavers to be used in this third embodiment. Each interleaver employs an interleaving sequence selected from the family of F sequences. With the third embodiment, permutation mechanisms are applied jointly across multiple OFDM symbols, when present.

With implementation (a), an interleaving sequence is selected from the family of F sequences and is used in each cell. The range of the interleaver covers the used and unused mini-CCEs from each of the n OFDM symbols. A cyclic shift may also be applied to the interleaver sequence. The selection of the interleaving sequence, and the cyclic shift when used, may be determined based on the cell-ID. With implementation (b), a single interleaving sequence from the family of F sequences is selected to support interleaving over n OFDM symbols. The single selected interleaving sequence is utilized in each of the cells, but with a different cyclic shift being applied in each one. The cyclic shift for each cell may be determined based on the cell-ID.

Figure 7:
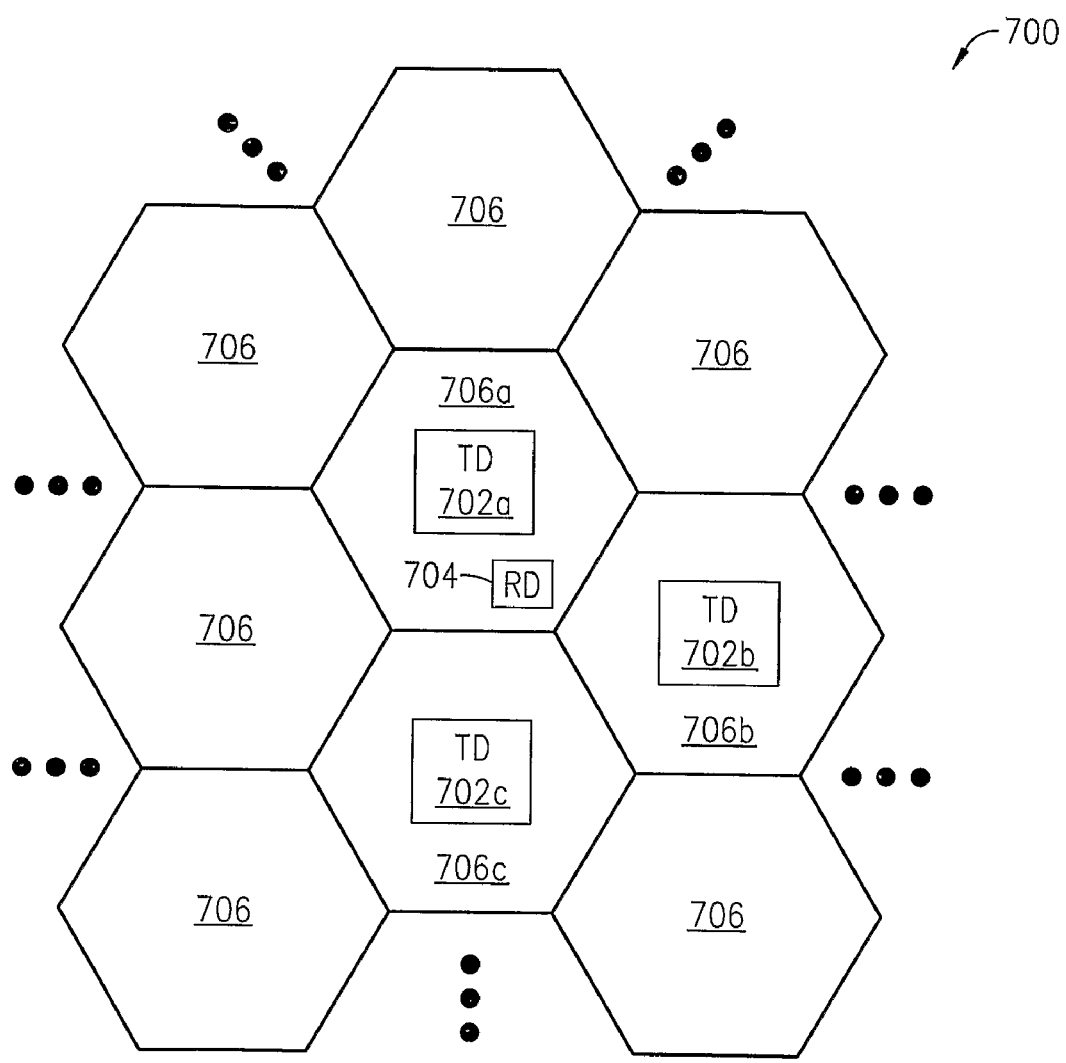
FIG. 7 is a block diagram of an example communications system that is divided into cells and that includes transmitting devices and receiving devices.

FIG. 7 is a block diagram of an example communications system 700 that is divided into cells 706 and that includes transmitting devices 702 and receiving devices 704. As illustrated, communications system 700 includes multiple cells 706. Each respective cell 706 includes at least one respective transmitting device 702. More specifically, cell 706a is associated with transmitting device 702a, cell 706b is associated with transmitting device 702b, and cell 706c is associated with transmitting device 702c.

Each transmitting device 702 may be in engaged in a communication exchange with one or more receiving devices 704.

For example, receiving device 704 is located within cell 706a. Thus, transmitting device 702a of cell 706a may be in communication with receiving device 704. Although only one receiving device 704 is shown for the sake of clarity, each transmitting device 702 may be communicating with one or multiple receiving devices 704. Similarly, although only three transmitting devices 702a, 702b, and 702c are explicitly shown, each cell 706 may include its own transmitting device 702 (or multiple transmitting devices 702).

In example embodiments for an OFDM system, each transmitting device 702 is a base station or other network communications node that broadcasts or otherwise transmits a control channel to the receiving devices 704 that are present within its respective cell 706. Receiving devices may be fixed, stationary, or mobile. In operation, transmitting device 702a transmits a control channel communication to receiving device 704. Meanwhile, transmitting devices 702b and 702c transmit control channel communications to their receiving devices (not shown). Unfortunately, the control channel communications from transmitting devices 702b and 702c may interfere with the reception of control channel communications from transmitting device 702a at receiving device 704.

It should be understood that the principles that are described herein are also applicable to many OFDM systems having characteristics that differ from those of communications system 700. For example, cells may be sectorized or otherwise shaped differently than cells 706. Moreover, a given transmitting device 702 need not be a base station or even a fixed node of a wireless communications system.

Figure 8:
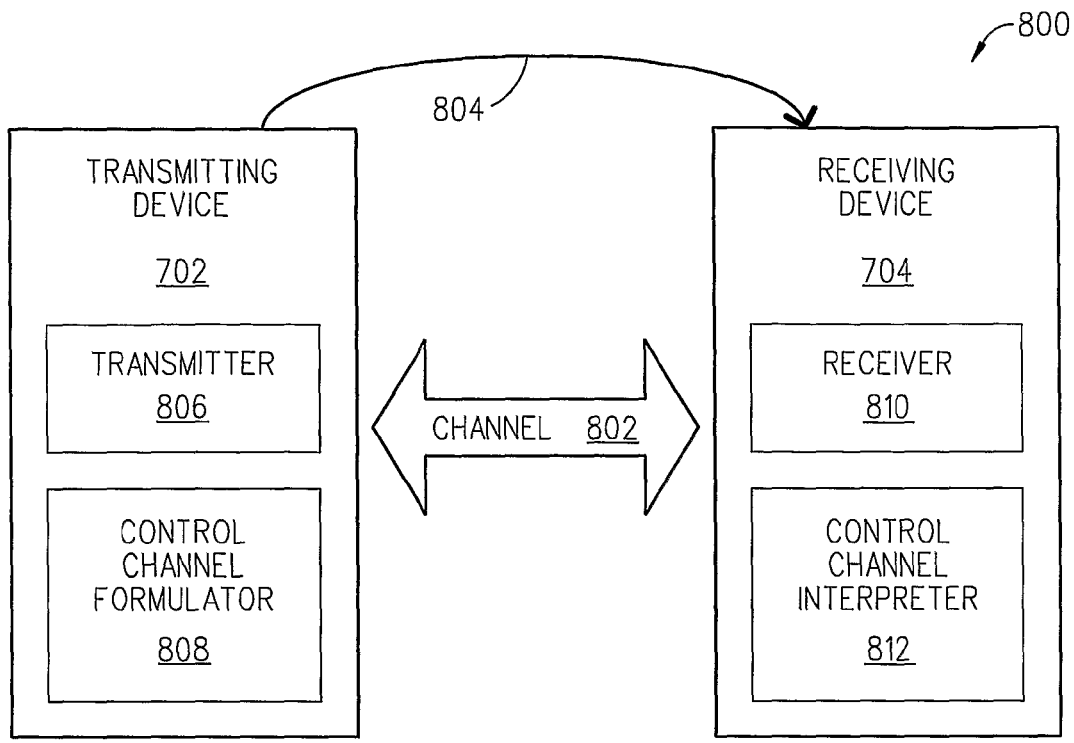
FIG. 8 is a block diagram of an example communications exchange between a transmitting device and a receiving device, with the transmitting device including a control channel formulator.

FIG. 8 is a block diagram of an example communications exchange 800 between transmitting device 702 and receiving device 704, with transmitting device 702 including a control channel formulator 808. As illustrated, communications exchange 800 includes a signal 804 that is being transmitted over a channel 802, in addition to including transmitting device 702 and receiving device 704. Transmitting device 702 includes a transmitter 806 and control channel formulator 808. Receiving device 704 includes a receiver 810 and a control channel interpreter 812.

In an example operation, transmitting device 702 transmits a signal 804 over channel 802 to receiving device 704. Receiving device 704 receives signal 804 from transmitting device 702 via channel 802. More specifically, control channel formulator 808 formulates control channel information from control channel data as is described herein. This control channel information is modulated and then transmitted by transmitter 806 as signal 804 over channel 802. At receiving device 704, signal 804 is received by receiver 810 and converted to baseband. Control channel interpreter 812 is adapted to interpret the control channel information to recover the original control channel data. An example approach to the formulation of control channel information is described herein below with particular reference to FIGS. 9-13. The interpretation thereof by control channel interpreter 812 entails implementing the applied permutation mechanisms (e.g., interleaving sequence and/or cyclic shifting) in reverse.

It should be understood that a single device may function as a transmitting device 702 at one moment and/or with respect to one communication and as a receiving device 704 at another moment and/or with respect to another communication. Examples of transmitting devices 702 and receiving devices 704 include, by way of example but not limitation, network communication nodes, remote terminals, and other devices that are capable of communicating a signal 804 over a channel 802. Network communication nodes may include, for example, a base transceiver station, a radio base station, a Node B, an access point, and so forth. Remote terminals may include, for example, a mobile terminal, a mobile station, a subscriber station, a communication card or module, and so forth. General example device implementations for transmitting/receiving devices 702/704 are described herein below with particular reference to FIG. 18.

Generally, channel 802 may be a wired channel or a wireless channel. Signal 804 may be propagated as a radio frequency signal, a light signal, and so forth. Regardless, for certain example embodiments, channel 802 comports with an OFDM communication scheme.

Figure 9:
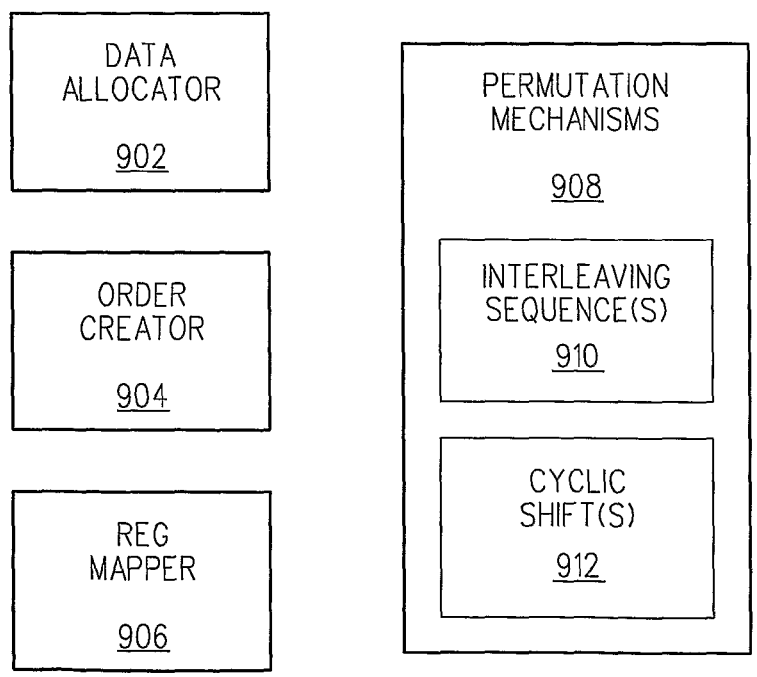
FIG. 9 is a block diagram of an example control channel formulator that includes a data allocator, an order creator, a resource element group mapper, and permutation mechanisms.

FIG. 9 is a block diagram of an example control channel formulator 808 (of FIG. 8). As illustrated, control channel formulator 808 includes a data allocator 902, an order creator 904, a resource element group mapper 906, and one or more permutation mechanisms 908. Permutation mechanisms 908 include at least one interleaving sequence 910 and may include one or more cyclic shifts 912. These components of control channel formulator 808 may be realized as fully or partially separate or combined processor-executable instructions. Processor-executable instructions may be embodied as hardware, firmware, software, fixed logic circuitry, combinations thereof, and so forth.

For example embodiments, a transmitting device 702 (e.g., of FIG. 8) is capable of formulating control channel information in an OFDM system in which a control channel spans n OFDM symbols, with n being an integer. At least one interleaving sequence 910 of one or more permutation mechanisms 908 has a low cross-correlation property with a family of sequences. Data allocator 902 allocates control channel data to at least one set of resource element groups.

Figure 1:
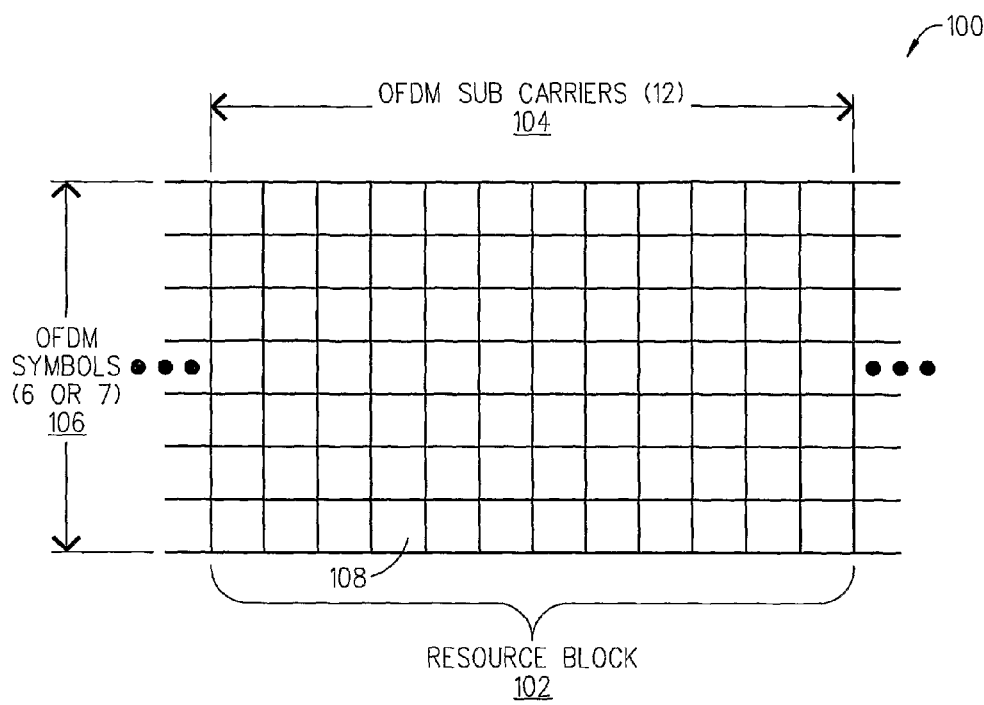
FIG. 1 depicts a portion of an example spectrum resource grid for an OFDM system.

Order creator 904 creates at least one order for the at least one set of the resource element groups in accordance with the one or more permutation mechanisms 908. A resource element group mapper 906 maps the at least one set of the resource element groups to resource elements 108 (of FIG. 1) of the n OFDM symbols of the control channel responsive to the at least one order that is created using the one or more permutation mechanisms 908.

Different embodiments utilize different permutation mechanisms 908. It should be noted that both implementations (a) and (b) of the first embodiment as well as the second embodiment apply one of n permutation mechanisms 908 respectively to one of n OFDM symbols.

With regard to implementation (a) of the first embodiment, there are n permutation mechanisms 908 that include n interleaving sequences 910 that are selected from a family of F sequences having low auto-correlation and low cross-correlation properties. The n interleaving sequences 910 are employed in common across multiple cells of the OFDM system. The n permutation mechanisms 908 further include a single cyclic shift 912 for the n OFDM symbols, with the single cyclic shift 912 being established to be different in each cell of multiple cells.

With regard to implementation (b) of the first embodiment, the n permutation mechanisms 908 include a single interleaving sequence 910 that is selected from a family of F sequences having low auto-correlation and low cross-correlation properties. The single interleaving sequence 910 is established to be different in each cell of multiple cells of the OFDM system. The n permutation mechanisms 908 further include at least n−1 cyclic shifts 912 that are respectively applied to n−1 OFDM symbols, with the at least n−1 cyclic shifts 912 being employed in common across the multiple cells.

With regard to the second embodiment, the n permutation mechanisms 908 include n interleaving sequences 910 that are selected from a family of F sequences having low cross-correlation properties. The n interleaving sequences 910 are established to be different in each cell of multiple cells of the OFDM system. Here, order creator 904 creates n respective orders along the OFDM frequency dimension for n sets of resource element groups using a different respective interleaving sequence 910 of the n interleaving sequences 910 for each respective one of the n OFDM symbols.

With regard to implementation (a) of the third embodiment, the n permutation mechanisms 908 include a single interleaving sequence 910 that is selected from a family of F sequences having low auto-correlation and low cross-correlation properties. The single interleaving sequence 910 is established to be different in each cell of multiple cells of the OFDM system. Here, order creator 904 creates at least one order for at least one set of resource element groups over the n OFDM symbols jointly.

With regard to implementation (b) of the third embodiment, the n permutation mechanisms 908 include a single interleaving sequence 910 that is selected from a family of F sequences having low auto-correlation and low cross-correlation properties. The single interleaving sequence 910 is employed in common across multiple cells of the OFDM system. The n permutation mechanisms 908 further include a single cyclic shift 912 for the n OFDM symbols, with the single cyclic shift 912 being established to be different in each cell. Here, order creator 904 creates at least one order for at least one set of resource element groups over the n OFDM symbols jointly.

Figure 10:
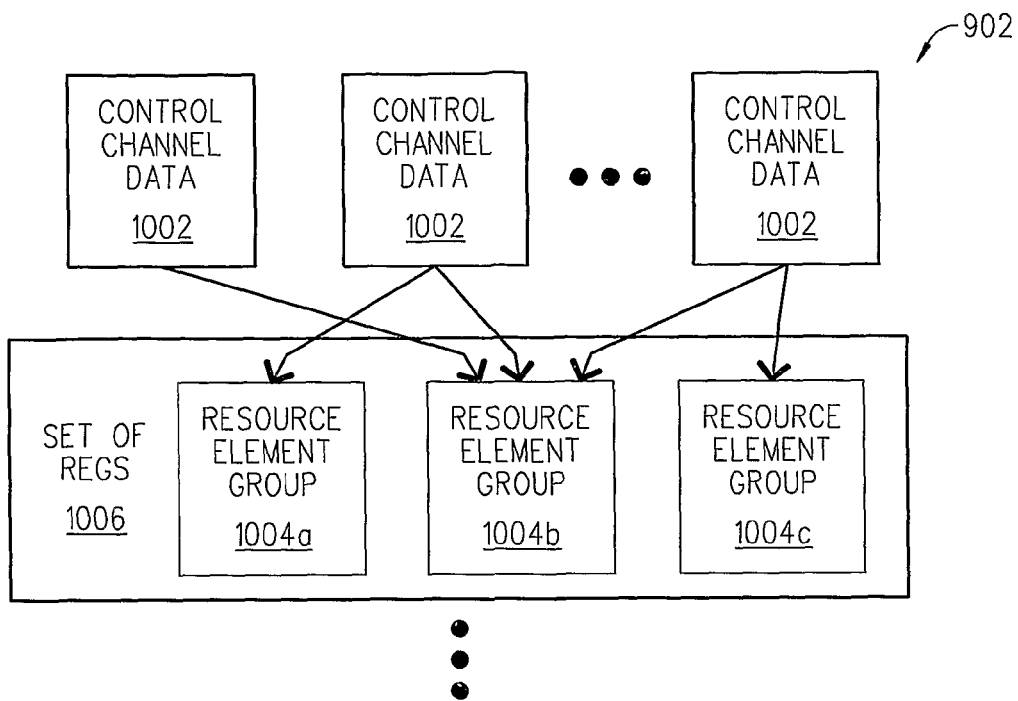
FIG. 10 is a block diagram of an example data allocator in operation.

FIG. 10 is a block diagram of an example data allocator 902 in operation. As illustrated, FIG. 10 includes control channel data 1002, resource element groups 1004, and at least one set of resource element groups 1006. In an example embodiment, data allocator 902 allocates control channel data 1002 to the resource element groups 1004 of at least one set of resource element groups 1006. Although three resource element groups 1004a, 1004b, and 1004c are shown, each set of resource element groups 1006 may include more or fewer resource element groups 1004.

Control channel data 1002 is control-related data that a transmitting device (e.g., a network communication node) is to transmit to a receiving device (e.g., a remote terminal). Examples of control channel data 1002 include, but are not limited to, power control instructions, HARQ process information, data block allocations, data transport format assignments such as the assigned data modulation and coding, antenna and antenna rank selection, reference symbol assignments, command for channel quality update, other control-related information, combinations thereof, and so forth. Each resource element group 1004 may comprise a group of two or more resource elements. By way of example only, each resource element group 1004 may be a mini-CCE.

When resource element groups 1004 are combined into a set of resource element groups 1006, each set of resource element groups 1006 may be ordered separately using a different permutation mechanism 908 (of FIG. 9). For the first and second embodiments, each set of resource element groups 1006 may correspond to a different OFDM symbol. Hence, if the control channel includes n OFDM symbols, resource element groups 1004 may be combined into n different sets of resource element groups 1006.

Figure 11:
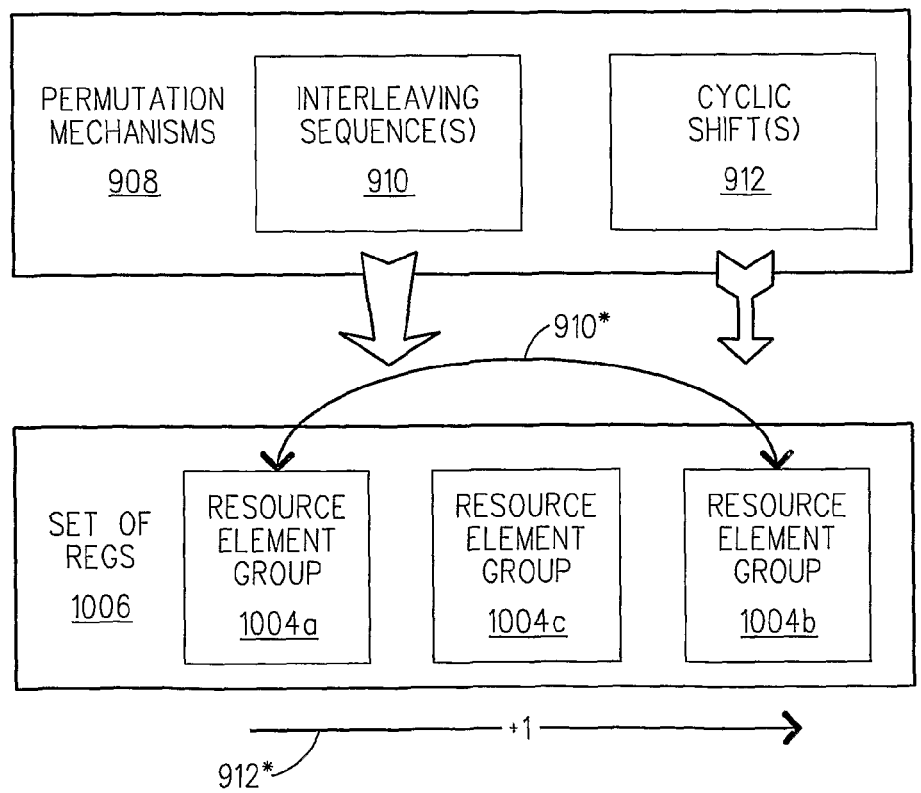
FIG. 11 is a block diagram of an example order creator in operation.

FIG. 11 is a block diagram of an example order creator 904 in operation. As illustrated, FIG. 11 includes permutation mechanisms 908, which have interleaving sequence(s) 910 and/or cyclic shift(s) 912, and at least one set of resource element groups 1006, which has multiple resource element groups 1004a, 1004b, and 1004c. In an example embodiment, order creator 904 creates at least one order for at least one set of the resource element groups 1006 in accordance with one or more permutation mechanisms 908. In other words, order creator 904 reorders the multiple resource element groups 1004 of each set of resource element groups 1006.

Thus, order creator 904 applies at least one interleaving sequence 910 and may apply one or more cyclic shifts 912. By way of example only, a specific interleaving sequence 910* and cyclic shift 912* are applied to resource element groups 1004a, 1004b, and 1004c in FIG. 11. Initially, resource element groups 1004 are in the following order: 1004a, 1004b, and 1004c (as shown in FIG. 10). In accordance with interleaving sequence 910*, resource element groups 1004a and 1004c are swapped to produce the following order: 1004c, 1004b, and 1004a (not shown). In accordance with cyclic shift 912* with a shift of +1, the resource element groups 1004 are shifted one place to produce the following order: 1004a, 1004c, and 1004b (as shown in FIG. 11).

Which interleaving sequence(s) 910 and/or cyclic shift(s) 912 are applied depend on what permutation mechanism(s) 908 are being instituted for a given embodiment and implementation thereof. Additional examples of the first, second, and third embodiments are described herein below after the description of FIG. 13 (e.g., in conjunction with the descriptions of FIGS. 14-17).

Figure 12:
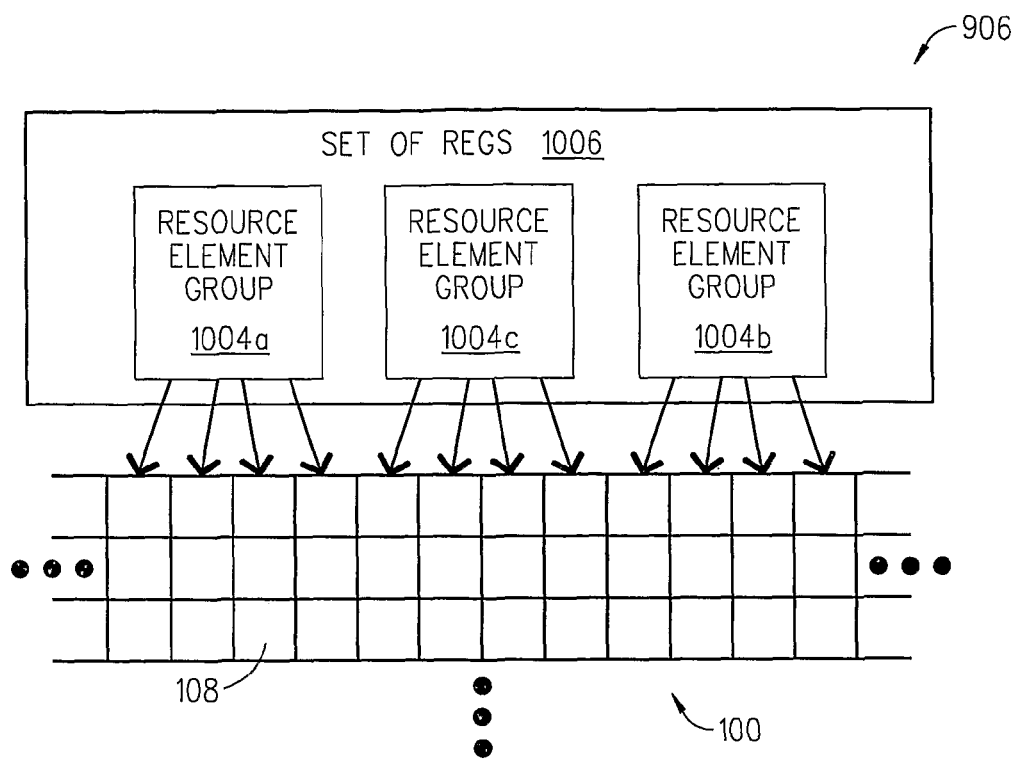
FIG. 12 is a block diagram of an example resource element group mapper in operation.

FIG. 12 is a block diagram of an example resource element group mapper 906 in operation. As illustrated, FIG. 12 includes at least one set of resource element groups 1006, as reordered in accordance with particular permutation mechanism(s), and spectrum resource grid 100. The set of resource element groups 1006 includes multiple resource element groups 1004. Spectrum resource grid 100 includes multiple resource elements 108.

In an example embodiment, resource element group mapper 906 maps at least one set of resource element groups 1006 to resource elements 108 of n OFDM symbols of a control channel responsive to the at least one order that is created by order creator 904 (of FIGS. 9 and 11) using one or more permutation mechanisms 908 (of FIGS. 9 and 11). In other words, resource element group mapper 906 maps resource element groups 1004 to resource elements 108 of spectrum resource grid 100 responsive to their reordering in the set of resource element groups 1006.

Although four arrows are shown per resource element group 1004, each resource element group 1004 may alternatively include more or fewer resource elements 108. For the first and second embodiments, the mapping may be performed on a per-OFDM symbol basis when n is greater than one (e.g., with each respective set of resource element groups 1006 corresponding to each respective OFDM symbol). For the third embodiment, the mapping may be performed across multiple OFDM symbols jointly when n is greater than one. Regardless, the mapping may be performed within or across resource blocks (e.g., resource block 102 of FIG. 1).

Figure 13:
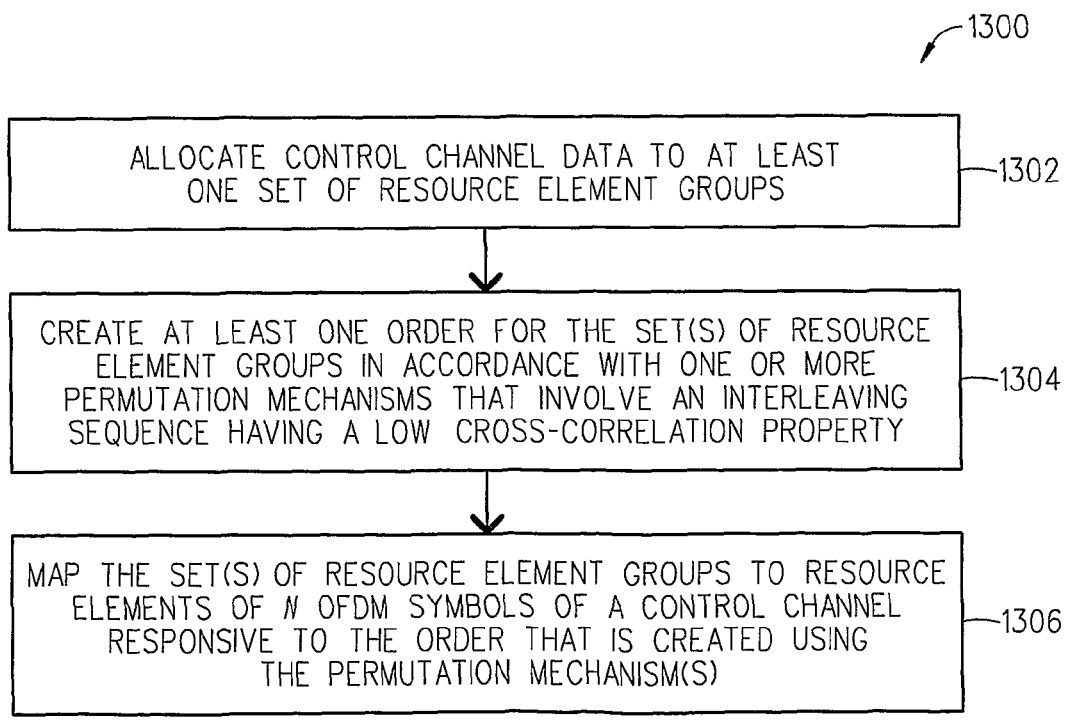
FIG. 13 is a flow diagram of an example method for control channel formulation in OFDM systems.

FIG. 13 is a flow diagram 1300 of an example method for control channel formulation in OFDM systems. As illustrated, flow diagram 1300 includes three blocks 1302-1306. Flow diagram 1300 may be implemented by a device, such as a transmitting device 702 (of FIGS. 7 and 8). Example embodiments for the acts of flow diagram 1300 are described below with reference to other FIGS. (e.g., FIGS. 9-12), but the acts may alternatively be performed by other elements.

The acts of flow diagram 1300 may be effectuated with processor-executable instructions. Processor-executable instructions may be embodied as hardware, firmware, software, fixed logic circuitry, combinations thereof, and so forth. Example operational implementations of processor-executable instructions include, but are not limited to, a memory coupled to a processor, an application-specific integrated circuit (ASIC), a digital signal processor and associated code, some combination thereof, and so forth.

In an example embodiment, flow diagram 1300 depicts a method of formulating control channel information for a transmitting device operating in an OFDM system in which a control channel spans n OFDM symbols, with n being an integer. The method includes acts of allocating, creating, and mapping. At block 1302, control channel data is allocated to at least one set of resource element groups. For example, control channel data 1002 may be allocated to the set of resource element groups 1006 by a data allocator 902.

At block 1304, at least one order for the at least one set of the resource element groups is created in accordance with one or more permutation mechanisms that involve at least one interleaving sequence having a low cross-correlation property. For example, an order for the set of resource element groups 1006 may be created in accordance with permutation mechanism(s) 908 by an order creator 904, with permutation mechanisms 908 including an interleaving sequence 910 having a low cross-correlation property.

At block 1306, the at least one set of the resource element groups are mapped to resource elements of the n OFDM symbols of the control channel responsive to the at least one order that is created using the one or more permutation mechanisms. For example, resource element groups 1004 of the set of resource element groups 1006 may be mapped to resource elements 108 of an OFDM control channel responsive to the order resulting from using permutation mechanisms 908. The mapping may be performed by a resource element group mapper 906 across one or multiple OFDM symbols individually or jointly, depending on the embodiment.

More detailed descriptions of the first, second, and third example embodiments are described below. With regard to the first embodiment, implementations are based on using different interleaving sequences from a family of F sequences that possesses both good auto-correlation and good cross-correlation properties. An example of such a set of sequences is the hyperbolic congruence sequences. (Hyperbolic congruence sequences are discussed by S. V. Maric and E. L. Titlebaum in "A class of frequency hopped codes with nearly ideal characteristics for use in multiple-access spread-spectrum communications and RADAR and SONAR systems," IEEE Trans. on Communications, 40(9):1442-1446, September 1992.)

A set of hyperbolic congruence sequences can be generated with the following rule:
p−1 sequences, each of length p−1, can be generated by choosing $1 \leq a \leq p-1$; and
For the ath sequence, the ith element can be generated according to $ai^{-1}$, for i=1, ..., p−1,
where $i^{-1}$ is the inverse of i in the Galois field of p elements and p is prime.

With regard to implementation (a) of the first embodiment, using this approach, two permutation patterns for the two OFDM symbols and 12 mini-CCEs in the above example can be generated using parameters a=3 and a=5, with p=13. Shorter permutation patterns may be generated by truncating a pattern based on the prime number p by removing the largest indices until the desired size is achieved.

FIGS. 14 and 15 illustrate mini-CCE permutations 1400 and 1500 for a desired cell and an interfering cell, respectively, that result when each OFDM symbol is associated with a different interleaving sequence and there is a per-cell cyclic shift in accordance with implementation (a) of the first embodiment. These mini-CCE permutations 1400 and 1500 for two OFDM symbols are generated using the approach and variable values given above. Mini-CCE permutations 1400 are for a desired cell, and mini-CCE permutations 1500 are for an interfering cell, with the same cyclic shift values used previously.

It should be understood that there is no need to cyclically shift the values from the same cell in different OFDM symbols because the low cross-correlation keeps the number of overlapping symbols relatively small. This aspect is also relevant from the perspective of obtaining good frequency diversity across the OFDM symbols. Combined with low auto-correlation, this can result in both relatively good interference randomization and good frequency diversity properties.

Examples of other sequences with low cross-correlation and auto-correlation properties include, but are not limited to, the cubic congruence sequences, the extended quadratic congruence sequences, Gold codes, and so forth. It should be noted that although the Costas sequences have good auto-correlation properties, they are not guaranteed to have good cross-correlation properties. It should also be noted that interference randomization properties may be increased if unused mini-CCEs are incorporated into the interleaving pattern as described in PCT Patent Application No. PCT/SE2008/050372.

With regard to implementation (b) of the first embodiment, this embodiment uses in each cell a different interleaving sequence from the family F of sequences with good cross-correlation and good auto-correlation properties. Within a given cell, a different cyclic shift is used for each OFDM symbol.

FIGS. 16 and 17 illustrate mini-CCE permutations 1600 and 1700 for a desired cell and an interfering cell, respectively, that result when each OFDM symbol is associated with a different cyclic shift and there is a per-cell interleaving sequence in accordance with implementation (b) of the first embodiment. Mini-CCE permutations 1600 is for a desired cell, and mini-CCE permutations 1700 is for an interfering cell. Both show interleaving patterns that are created using a different sequence from the hyperbolic congruence sequence family. A function that hashes the cell-ID is employed to determine the interleaving sequence for each cell.

Because of each sequence's low auto-correlation properties, a different cyclic shift is selected for each OFDM symbol within a given cell. These cyclic shift values may be common across cells. In FIGS. 16 and 17, a shift value of 6 is used for the second OFDM symbol in both the desired and the interfering cells. Alternatively, the cyclic shift values may be respective parameters that are listed together with respective ones of the interleaving sequences and that are tuned for those sequences. In other words, the cyclic shifts may be different depending on which interleaving sequence is selected.

With regard to the second embodiment, a different interleaving sequence is utilized in each cell with the sequence being selected from a family F of sequences with good cross-correlation properties, but not necessarily good auto-correlation properties. Examples of sequences with low cross-correlation properties include (in addition to those with both low cross-correlation and low auto-correlation that are provided herein above), but are not limited to, linear congruence sequences, and so forth. (Such sequences are discussed in the Master's/Bachelor's theses, "Large Sets of Frequency Hopped Waveforms with Nearly Ideal Orthogonality Properties," by Scott Thurston Rickard Jr., Massachusetts Institute of Technology, submitted to the Department of Electrical Engineering and Computer Science on Aug. 6, 1993.) In an example implementation, there may be n functions that can hash the cell-ID to the sequence index range {0, 1, ..., F−1}.

With these n functions, a cell can select n interleaving sequences for the n OFDM symbols. Thus, for a given cell-ID, the n hash functions are to provide n different sequence indices. Frequency diversity and interference randomization can result from the good cross-correlation properties amongst the different sequences.

An alternative implementation involves employing one hash function H(ID) and n−1 sequence ID offsets $\Delta_1$, $\Delta_2, \ldots, \Delta_{n-1}$. In this implementation, a cell employs interleaving sequence no. H(ID) for the $1^{st}$ OFDM symbol, H(ID)+$\Delta_1$ for the $2^{nd}$ OFDM symbol, and so forth. The sequence ID offsets may be common across each of the cells. Alternatively, the sequence ID offsets may be respective parameters that are listed together with respective ones of the interleaving sequences and that are tuned for the ones with which they are listed. In other words, the sequence ID offsets may be different depending on which interleaving sequence is selected with the hashing function.

With regard to the third embodiment, instead of interleaving the n OFDM symbols individually, the family F of sequences with good auto-correlation and good cross-correlation properties may be applied to the resources in n OFDM symbols jointly. An example of an applicable set of sequences is the hyperbolic congruence sequences, which are described herein above.

With regard to implementation (a) of the third embodiment, an interleaving sequence is selected from, e.g., the hyperbolic congruence sequences family for each cell. A cyclic shift may also be applied to the interleaver sequence. The selection of the interleaver sequence and/or the selection of the cyclic shift (when utilized) may be determined by the cell-ID.

With regard to implementation (b) of the third embodiment, a single interleaving sequence from the family F is selected to support interleaving over n OFDM symbols. The single selected interleaving sequence may be used in each of the cells, but with a different cyclic shift being applied in each. The cyclic shift for each cell may be determined by the cell-ID.

Figure 18:
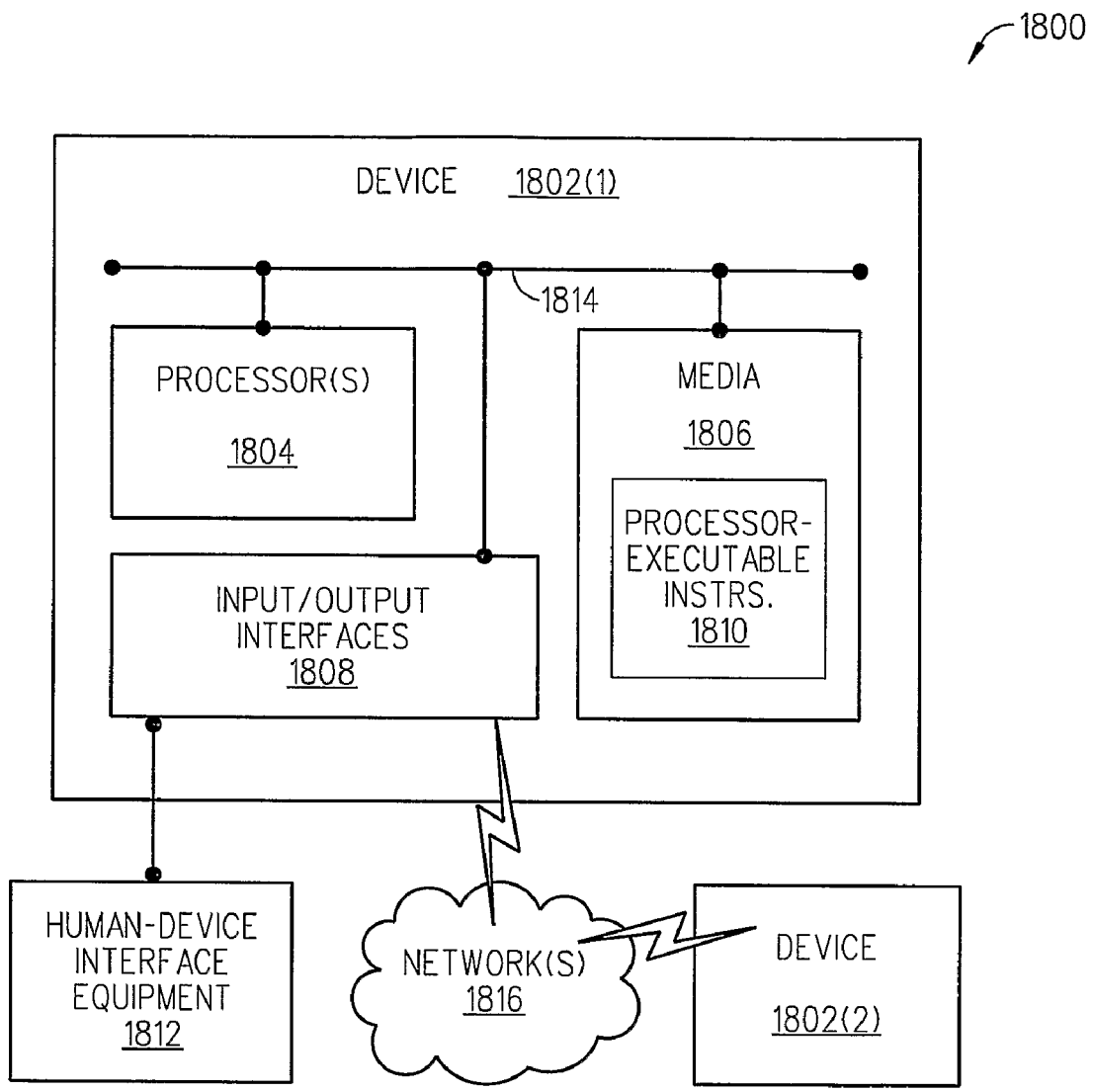
FIG. 18 is a block diagram of example devices that may be used to implement embodiments for control channel formulation in OFDM systems.

FIG. 18 is a block diagram 1800 of example devices 1802 that may be used to implement embodiments for control channel formulation in OFDM systems. As illustrated, block diagram 1800 includes two devices 1802(1) and 1802(2), human-device interface equipment 1812, and one or more networks 1816. As explicitly shown with device 1802(1), each device 1802 may include at least one processor 1804, one or more media 1806, one or more input/output interfaces 1808, and at least one interconnection 1814. Media 1806 may include processor-executable instructions 1810. Network(s) 1816 may be, by way of example but not limitation, an internet, an intranet, an Ethernet, a public network, a private network, a cable network, a digital subscriber line (DSL) network, a telephone network, a wired network, a wireless network, some combination thereof, and so forth. Device 1802(1) and device 1802(2) may communicate over network(s) 1816.

For example embodiments, device 1802 may represent any processing-capable device. Processor 1804 may be implemented using any applicable processing-capable technology, and one may be realized as a general-purpose or a special-purpose processor. Examples include, but are not limited to, a central processing unit (CPU), a digital signal processor (DSP), a microprocessor, some combination thereof, and so forth. Media 1806 may be any available media that is included as part of and/or is accessible by device 1802. It includes volatile and non-volatile media, removable and non-removable media, storage media (e.g., memory) and transmission media (e.g., wireless or wired communication channels), hard-coded logic media (which may include memory and/or at least one processor), combinations thereof, and so forth. Media 1806 is tangible media when it is embodied as a manufacture and/or as a composition of matter.

Interconnection 1814 interconnects the components of device 1802. Interconnection 1814 may be realized as a bus or other connection mechanism and may directly or indirectly interconnect various components. I/O interfaces 1808 may include (i) a network interface for monitoring and/or communicating across network 1816, (ii) a display device interface for displaying information on a display screen, (iii) one or more human-device interfaces, and so forth. Example network interfaces include, but are not limited to, a radio or transceiver (e.g., a transmitter and/or receiver), a modem, a network card, some combination thereof, and so forth. Human-device interface equipment 1812 may be a keyboard/keypad, a touch screen, a remote, a mouse or other graphical pointing device, a screen, a speaker, and so forth. Human-device interface equipment 1812 may be integrated with or discrete from device 1802

Generally, processor 1804 is capable of executing, performing, and/or otherwise effectuating processor-executable instructions, such as processor-executable instructions 1810. Media 1806 is comprised of one or more processor-accessible media. In other words, media 1806 may include processor-executable instructions 1810 that are executable by processor 1804 to effectuate the performance of functions by device 1802. Processor-executable instructions 1810 may be embodied as software, firmware, hardware, fixed logic circuitry, some combination thereof, and so forth. Processor 1804 and processor-executable instructions 1810 of media 1806 may be realized separately (e.g., as a DSP executing code) or in an integrated form (e.g., as part of an application-specific integrated circuit (ASIC)).

In example implementations, one device 1802 may comprise a transmitting device 702, and another device 1802 may comprise a receiving device 704 (both of FIGS. 7 and 8). Processor-executable instructions 1810 may comprise, for example, control channel formulator 808 (of FIGS. 8 and 9) or control channel interpreter 812 (of FIG. 8). When processor-executable instructions 1810 are executed by processor 1804, the functions that are described herein may be effectuated. Example functions include, but are not limited to, those illustrated by flow diagram 1300 (of FIG. 13) and the operations of FIGS. 10-12, as well as those pertaining to features illustrated by the various system-level, cell-level, and OFDM-symbol-level embodiments and implementations.

Different embodiment(s) of the invention can offer one or more advantages. Generally, multiple described embodiments involve selecting sequences for interleaving that have good auto-correlation and/or good cross-correlation properties. An advantage of certain embodiment(s) of the present invention is that when interleaving sequences are selected having both low auto-correlation and low cross-correlation properties, both relatively good interference randomization and good frequency diversity performance may be achieved. Embodiments that use such sequences for interleaving can provide relatively good performance with the relatively low overhead.

Another advantage of certain embodiment(s) of the present invention is that they comport with schemes for specifying an interleaver per OFDM symbol. This can help obviate concerns with having a fixed placement of the PHICH and PCFICH fields. Moreover, with implementation (a) of the first embodiment, the basic structure of having a common interleaver (or a common set of interleavers), plus a cell-specific cyclic shift may be employed. Also, with this implementation and embodiment, one cell-specific cyclic shift may be utilized because respective different sequences are used for respective different OFDM symbols.

The devices, acts, features, functions, methods, schemes, data structures, operations, components, etc. of FIGS. 1 and 3-18 are illustrated in diagrams that are divided into multiple blocks and other elements. However, the order, interconnections, interrelationships, layout, etc. in which FIGS. 1 and 3-18 are described and/or shown are not intended to be construed as a limitation, and any number of the blocks and/or other elements may be modified, combined, rearranged, augmented, omitted, etc. in many manners to implement one or more systems, methods, devices, media, apparatuses, arrangements, etc. for control channel formulation in OFDM systems.

Although multiple embodiments of the present invention have been illustrated in the accompanying Drawings and described in the foregoing Detailed Description, it should be understood that the invention is not limited to the disclosed embodiments, for it is also capable of numerous rearrangements, modifications and substitutions without departing from the scope of the invention as set forth and defined by the following claims.

The invention claimed is:

1. A method of formulating control channel information for a transmitting device operating in an orthogonal frequency division multiplexing (OFDM) system in which a control channel spans n OFDM symbols, with n being an integer equal to one or more; the method comprising acts of:
    allocating control channel data to at least one set of resource element groups;
    creating at least one order for the at least one set of the resource element groups in accordance with one or more permutation mechanisms that involve at least one interleaving sequence having a low cross-correlation property; and
    mapping the at least one set of the resource element groups to resource elements of the n OFDM symbols of the control channel responsive to the at least one order that is created using the one or more permutation mechanisms.

2. The method as recited in claim 1, wherein n is an integer greater than one, the at least one set of the resource element groups comprises n sets of the resource element groups, and the one or more permutation mechanisms comprise n permutation mechanisms; and wherein:
    the act of allocating comprises allocating the control channel data to the n sets of the resource element groups;
    the act of creating comprises creating n respective orders along an OFDM frequency dimension for the n sets of the resource element groups for respective ones of the n OFDM symbols in accordance with the n permutation mechanisms, the n permutation mechanisms differing from one another; and
    the act of mapping comprises mapping the n sets of the resource element groups to the resource elements of the respective ones of the n OFDM symbols responsive to the n respective orders that are created using the n permutation mechanisms.

3. The method as recited in claim 2, wherein the n permutation mechanisms entail n interleaving sequences that are selected from a family of F sequences having low auto-correlation and low cross-correlation properties; wherein the n interleaving sequences are employed in common across multiple cells of the OFDM system; and
    wherein the act of creating further comprises creating the n respective orders along the OFDM frequency dimension for the n sets of the resource element groups using a different respective interleaving sequence of the n interleaving sequences for each respective one of the n OFDM symbols.

4. The method as recited in claim 3, wherein the n permutation mechanisms further entail a single cyclic shift for the n OFDM symbols; and
    wherein the act of creating further comprises creating the n respective orders along the OFDM frequency dimension for the n sets of the resource element groups using the single cyclic shift for the n OFDM symbols.

5. The method as recited in claim 4, wherein the OFDM system comprises a cell-based wireless system; wherein each cell of the cell-based wireless system has a different single cyclic shift that is used across its n OFDM symbols; and wherein the single cyclic shift for each cell is based on an identifier of the cell.

6. The method as recited in claim 2, wherein the n permutation mechanisms entail a single interleaving sequence that is selected from a family of F sequences having low auto-correlation and low cross-correlation properties; wherein each cell of the OFDM system employs a different interleaving sequence derived from the family of F sequences; wherein the n permutation mechanisms entail at least n−1 cyclic shifts; and
    wherein the act of creating further comprises creating the n respective orders along the OFDM frequency dimension for the n sets of the resource element groups using the single interleaving sequence and a different respective cyclic shift of the at least n−1 cyclic shifts for each respective one of the n OFDM symbols.

7. The method as recited in claim 6, further comprising an act of:
    hashing an identifier of a cell to one of F numbers to select from the family of F sequences an interleaving sequence as the single interleaving sequence.

8. The method as recited in claim 7, wherein the at least n−1 cyclic shifts are employed in common across multiple cells of the OFDM system, or the at least n−1 cyclic shifts are predefined in dependence on the single interleaving sequence as selected from the family of F sequences.

9. The method as recited in claim 2, wherein the n permutation mechanisms entail n interleaving sequences that are selected from a family of F sequences having low cross-correlation properties; and
    wherein the act of creating further comprises creating the n respective orders along the OFDM frequency dimension for the n sets of the resource element groups using a different respective interleaving sequence of the n interleaving sequence for each respective one of the n OFDM symbols.

10. The method as recited in claim 9, wherein the n interleaving sequences that are employed in each cell of the OFDM system differ among different cells; and wherein the method comprises a further act of:
    using a respective function selected from n functions to hash an identifier of a cell to one of F numbers to select a respective interleaving sequence from the family of F sequences for each respective permutation mechanism of the n permutation mechanisms.

11. The method as recited in claim 9, wherein the n interleaving sequences that are employed in each cell of the OFDM system differ among different cells; and wherein the method comprises further acts of:

using a function to hash an identifier of a cell to one of F numbers to select an interleaving sequence from the family of F sequences for one permutation mechanism of the n permutation mechanisms; and using a respective sequence identification offset of n−1 sequence identification offsets and the selected interleaving sequence to select a respective interleaving sequence from the family of F sequences for each other respective permutation mechanism of the n permutation mechanisms.

12. The method as recited in claim 11, wherein the n−1 sequence identification offsets are employed in common across multiple cells of the OFDM system, or the n−1 sequence identification offsets are predefined in dependence on the selected interleaving sequence from the family of F sequences.

13. The method as recited in claim 1, wherein the one or more permutation mechanisms entail a single interleaving sequence that is selected from a family of F sequences having low auto-correlation and low cross-correlation properties; and wherein the act of creating further comprises creating the at least one order for the at least one set of the resource element groups over the n OFDM symbols jointly.

14. The method as recited in claim 13, wherein a range of the single interleaving sequence covers both used and unused resource element groups of the control channel; and wherein the act of creating further comprises creating the at least one order for the at least one set of the resource element groups over both the used and the unused resource element groups.

15. The method as recited in claim 13, wherein each cell of the OFDM system employs a different single interleaving sequence; and wherein the method further comprises an act of:

hashing an identifier of a cell to one of F numbers to select from the family of F sequences an interleaving sequence as the single interleaving sequence.

16. The method as recited in claim 15, wherein the one or more permutation mechanisms entails a cyclic shift that is dependent on the identifier of the cell; and wherein the act of creating further comprises creating the at least one order for the at least one set of the resource element groups over the n OFDM symbols jointly using the cyclic shift that is dependent on the identifier of the cell.

17. The method as recited in claim 13, wherein each cell of the OFDM system employs a common single interleaving sequence; wherein the one or more permutation mechanisms entails a cyclic shift that is dependent on an identifier of a cell; and wherein the act of creating further comprises creating the at least one order for the at least one set of the resource element groups over the n OFDM symbols jointly using the cyclic shift that is dependent on the identifier of the cell.

18. The method as recited in claim 1, wherein each resource element group of the set of resource element groups comprises a mini-control channel element, mini-CCE.

19. The method as recited in claim 1, wherein the at least one interleaving sequence having a low cross-correlation property comprises a sequence selected from hyperbolic congruence sequences, cubic congruence sequences, or extended quadratic congruence sequences.

20. A transmitting device for formulating control channel information in an orthogonal frequency division multiplexing (OFDM) system in which a control channel spans n OFDM symbols, with n being an integer equal to one or more; the transmitting device comprising:

at least one processor; and
one or more memory including processor-executable instructions that are configured to be executed by the at least one processor, the processor-executable instructions adapted to direct the transmitting device to perform acts comprising:
allocating control channel data to at least one set of resource element groups;
creating at least one order for the at least one set of the resource element groups in accordance with one or more permutation mechanisms that involve at least one interleaving sequence having a low cross-correlation property; and
mapping the at least one set of the resource element groups to resource elements of the n OFDM symbols of the control channel responsive to the at least one order that is created using the one or more permutation mechanisms.

21. A memory storing processor-executable instructions for formulating control channel information for a transmitting device operating in an orthogonal frequency division multiplexing (OFDM) system in which a control channel spans n OFDM symbols, with n being an integer equal to one or more; wherein the processor-executable instructions, when executed, direct the transmitting device to perform acts comprising:

allocating control channel data to at least one set of resource element groups;
creating at least one order for the at least one set of the resource element groups in accordance with one or more permutation mechanisms that involve at least one interleaving sequence having a low cross-correlation property; and
mapping the at least one set of the resource element groups to resource elements of the n OFDM symbols of the control channel responsive to the at least one order that is created using the one or more permutation mechanisms.

22. A transmitting device for formulating control channel information in an orthogonal frequency division multiplexing (OFDM) system in which a control channel spans n OFDM symbols, with n being an integer equal to one or more; the transmitting device comprising:

one or more permutation mechanisms that include at least one interleaving sequence having a low cross-correlation property;
a data allocator to allocate control channel data to at least one set of resource element groups;
an order creator to create at least one order for the at least one set of the resource element groups in accordance with the one or more permutation mechanisms; and
a resource element group mapper to map the at least one set of the resource element groups to resource elements of the n OFDM symbols of the control channel responsive to the at least one order that is created using the one or more permutation mechanisms.

23. The transmitting device as recited in claim 22, wherein n is an integer greater than one, the at least one set of the resource element groups comprises n sets of the resource element groups, and the one or more permutation mechanisms comprise n permutation mechanisms; and wherein:

the data allocator is to allocate the control channel data to the n sets of the resource element groups;
the order creator is to create n respective orders along an OFDM frequency dimension for the n sets of the resource element groups for respective ones of the n OFDM symbols in accordance with the n permutation mechanisms, the n permutation mechanisms differing from one another; and the resource element group mapper is to map the n sets of the resource element groups to the resource elements of the respective ones of the n OFDM symbols responsive to the n respective orders that are created using the n permutation mechanisms.

24. The transmitting device as recited in claim 23, wherein the n permutation mechanisms include n interleaving sequences that are selected from a family of F sequences having low auto-correlation and low cross-correlation properties, and the n interleaving sequences are employed in common across multiple cells of the OFDM system; and wherein the n permutation mechanisms further include a single cyclic shift for the n OFDM symbols, with the single cyclic shift being established differently per cell.

25. The transmitting device as recited in claim 23, wherein the n permutation mechanisms include a single interleaving sequence that is selected from a family of F sequences having low auto-correlation and low cross-correlation properties, and the single interleaving sequence is established differently per cell in each cell of multiple cells of the OFDM system; and wherein the n permutation mechanisms further include at least n−1 cyclic shifts that are respectively applied to n−1 OFDM symbols, with the at least n−1 cyclic shifts being employed in common across the multiple cells.

26. The transmitting device as recited in claim 23, wherein the n permutation mechanisms include n interleaving sequences that are selected from a family of F sequences having low cross-correlation properties, and the n interleaving sequences are established differently per cell in each cell of multiple cells of the OFDM system; and wherein the order creator is to create the n respective orders along the OFDM frequency dimension for the n sets of the resource element groups using a different respective interleaving sequence of the n interleaving sequence for each respective one of the n OFDM symbols.

27. The transmitting device as recited in claim 22, wherein the n permutation mechanisms include a single interleaving sequence that is selected from a family of F sequences having low auto-correlation and low cross-correlation properties, and the single interleaving sequence is established differently per cell in each cell of multiple cells of the OFDM system; and wherein the order creator is to create the at least one order for the at least one set of the resource element groups over the n OFDM symbols jointly.

28. The transmitting device as recited in claim 22, wherein the n permutation mechanisms include a single interleaving sequence that is selected from a family of F sequences having low auto-correlation and low cross-correlation properties, and the single interleaving sequence is employed in common across multiple cells of the OFDM system; wherein the n permutation mechanisms further include a single cyclic shift for the n OFDM symbols, with the single cyclic shift being established differently per cell; and wherein the order creator is to create the at least one order for the at least one set of the resource element groups over the n OFDM symbols jointly.

* * * * *

UNITED STATES PATENT AND TRADEMARK OFFICE
CERTIFICATE OF CORRECTION

PATENT NO. : 8,385,360 B2
APPLICATION NO. : 12/740457
DATED : February 26, 2013
INVENTOR(S) : Molnar et al.

Page 1 of 1

It is certified that error appears in the above-identified patent and that said Letters Patent is hereby corrected as shown below:

In the Specifications

In Column 1, Lines 7-13, delete "This..........herein." and insert -- This application claims the benefit of U.S. Provisional Application No. 60/983,372, filed October 29, 2007, the disclosure of which is fully incorporated herein by reference. --, therefor.

In Column 3, Line 62, delete "interleaves" and insert -- interleaver --, therefor.

In Column 4, Line 26, delete "Generally;" and insert -- Generally, --, therefor.

Signed and Sealed this
Sixteenth Day of July, 2013

Teresa Stanek Rea
*Acting Director of the United States Patent and Trademark Office*